US010300499B2

(12) United States Patent
Hornek et al.

(10) Patent No.: US 10,300,499 B2
(45) Date of Patent: May 28, 2019

(54) CENTRIFUGE WITH REMOVABLE ROTOR

(71) Applicant: ANDREAS HETTICH GMBH & CO. KG, Tuttlingen (DE)

(72) Inventors: Matthias Hornek, Tuttlingen (DE); Frank Thuringer, Wurmlingen (DE); Andreas Holderle, Braunlingen (DE); Klaus-Gunter Eberle, Tuttlingen (DE)

(73) Assignee: ANDREAS HETTICH GMBH & CO. KG, Tuttlingen (DE)

( * ) Notice: Subject to any disclaimer, the term of this patent is extended or adjusted under 35 U.S.C. 154(b) by 492 days.

(21) Appl. No.: 14/905,828

(22) PCT Filed: Jul. 10, 2014

(86) PCT No.: PCT/EP2014/064868
§ 371 (c)(1),
(2) Date: Jan. 18, 2016

(87) PCT Pub. No.: WO2015/007620
PCT Pub. Date: Jan. 22, 2015

(65) Prior Publication Data
US 2016/0158769 A1    Jun. 9, 2016

(30) Foreign Application Priority Data

Jul. 18, 2013 (DE) ........................ 10 2013 107 681

(51) Int. Cl.
*B04B 9/08* (2006.01)
*F16D 1/108* (2006.01)

(52) U.S. Cl.
CPC .......... *B04B 9/08* (2013.01); *B04B 2009/085* (2013.01); *F16D 1/108* (2013.01)

(58) Field of Classification Search
CPC ....... B04B 9/08; B04B 2009/085; B04B 9/00; F16D 1/108
(Continued)

(56) References Cited

U.S. PATENT DOCUMENTS 5,681,257 A * 10/1997 Letourneur ............... B04B 9/08
403/325
6,063,018 A * 5/2000 Letourneur ............... B04B 9/08
403/327
(Continued)

FOREIGN PATENT DOCUMENTS

DE       69514988 T2    10/2000
DE    202010014803 U1    2/2011
(Continued)

OTHER PUBLICATIONS

German Patent Office, German Examination Report, dated April 2, 2014, p. 1-6, Application No. 102013107681.5, Applicant: Andreas Hettich GmbH & Co. KG.
(Continued)

*Primary Examiner* — Charles Cooley
(74) *Attorney, Agent, or Firm* — Woodling, Krost and Rust

(57) ABSTRACT

A centrifuge having a driveshaft that has an end section that tapers toward the central axis of the driveshaft. A rotor is removably mounted on the driveshaft such that the rotor may be axially removed in a removal direction. A bearing surface of a locking element of the rotor is connected to the driveshaft and holds the rotor against removal. A quick-action closure is integrated into the rotor and prevents removal of the driveshaft and the rotor in the removal direction. The end section of the driveshaft extends through an opening in the rotor where it is partially surrounded by multiple locking elements of the rotor for fixing the rotor and the driveshaft together. The locking elements include bearing surfaces engaging the end section and support surfaces engaging the rotor. The quick-action closure has force-transmitting elements which connect the locking elements to
(Continued)

a handle permitting locking and/or unlocking the quick-action closure by a respective movement of the handle.

20 Claims, 7 Drawing Sheets

(58) Field of Classification Search
USPC ............... 494/12, 16, 20, 33, 38, 64, 84, 85; 210/232
See application file for complete search history.

(56) References Cited

U.S. PATENT DOCUMENTS

| | | | | |
|---|---|---|---|---|
| 6,764,438 B2* | 7/2004 | Potter | ................... | B04B 5/0414 494/12 |
| 6,776,751 B2* | 8/2004 | Potter | ....................... | B04B 9/08 494/12 |
| 6,802,803 B2* | 10/2004 | Potter | ................... | B04B 5/0414 494/12 |
| 6,981,304 B2* | 1/2006 | Potter | ................... | B04B 5/0414 29/428 |
| 7,011,618 B2* | 3/2006 | Potter | ....................... | B04B 9/08 494/12 |
| 7,137,198 B2* | 11/2006 | Potter | ................... | B04B 5/0414 29/889 |
| 7,464,450 B2* | 12/2008 | Potter | ....................... | B04B 9/08 29/428 |
| 8,852,070 B2* | 10/2014 | Peters | ....................... | B04B 9/08 494/12 |
| 9,539,588 B2* | 1/2017 | Le Guyader | .............. | B04B 9/08 |
| 2004/0220037 A1* | 11/2004 | Potter | ................... | B04B 5/0414 494/12 |
| 2004/0224831 A1* | 11/2004 | Potter | ................... | B04B 5/0414 494/12 |
| 2004/0229742 A1* | 11/2004 | Potter | ....................... | B04B 9/08 494/12 |
| 2005/0221971 A1* | 10/2005 | Potter | ....................... | B04B 9/08 494/37 |
| 2008/0146429 A1 | 6/2008 | Woodman | | |
| 2016/0158769 A1* | 6/2016 | Hornek | ..................... | B04B 9/08 494/83 |
| 2017/0050194 A1* | 2/2017 | Hornek | ..................... | B04B 7/00 |
| 2017/0050195 A1* | 2/2017 | Hornek | ................. | B04B 5/0414 |
| 2018/0318847 A1* | 11/2018 | Luersmann | ............... | B04B 1/08 |

FOREIGN PATENT DOCUMENTS

| | | |
|---|---|---|
| JP | S56164040 U | 12/1981 |
| JP | 7-284695 * | 10/1995 |
| JP | 2001205136 A | 7/2001 |
| WO | 8304379 A1 | 12/1983 |
| WO | WO-83/04379 A1 * | 12/1983 ........... B04B 5/0414 |
| WO | 2011054906 A1 | 5/2011 |

OTHER PUBLICATIONS

European Patent Office, International Search Report, Written Opinion, dated Oct. 17, 2014, pp. 1-11, PCT/EP2014/064868.

The International Bureau, International Preliminary Report on Patentability, dated Jan. 28, 2016, pp. 1-16, International Application No. PCT/EP2014/064868, Applicant: Andreas Hettich GmbH & Co. KG.

* cited by examiner

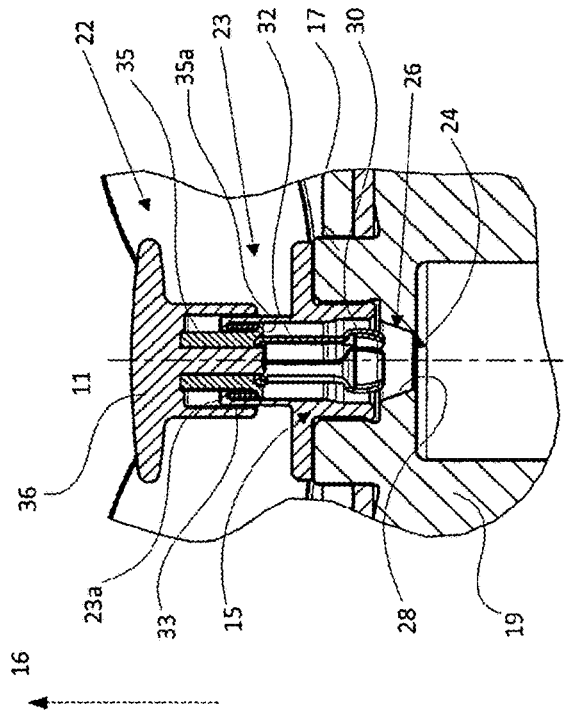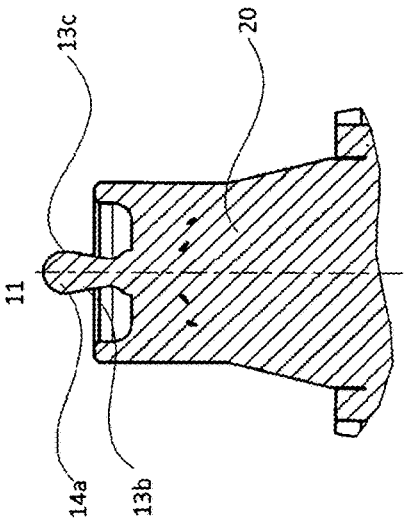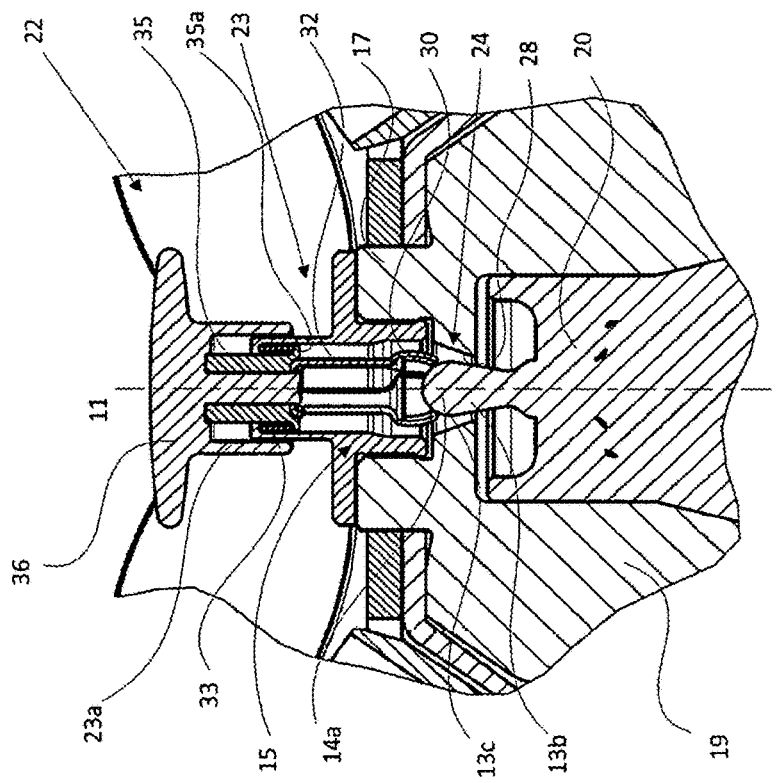

CENTRIFUGE WITH REMOVABLE ROTOR

BACKGROUND OF THE INVENTION

Centrifuges with removable rotors are already known which include a device for axially locking the rotor on the driveshaft and which do not require any time-consuming assembly or specific tools to achieve such locking. Document DE 695 14 988 T2, for example, proposes a centrifuge whose rotor will automatically be guided into a locking position when placed on the centrifuge. In this case, a spring-loaded lock engages a recess in the driveshaft, thus ensuring secure axial locking of the rotor. However, this solution is disadvantageous in that the driveshaft will have to be inserted into the rotor to a not inconsiderable extent to ensure sufficient contact surface for the locking mechanism, and in that such locking occurs below the rotor. This makes it more space-consuming. Furthermore, positioning part of the locking mechanism in the driveshaft will weaken the latter. Consequently, such designs only have a limited speed and/or durability.

Document DE 20 2010 014 803 U1 discloses a generic centrifuge. This centrifuge includes a rotor bearing arrangement with a locking system in which the rotor is firmly secured on the driveshaft. This locking system comprises axes which extend perpendicular to the axis of rotation, as well as locking levers which can be pivoted about such axes between locking and unlocking positions thereof. In their locking position, the locking levers engage an annular groove in the driveshaft, thus fixing the rotor in its axial position on the shaft. Depending on the speed, the locking fevers can be automatically transferred from their unlocking position into their locking position. At approx. 600 rpm, laboratory centrifuges often pass through their first resonance. However, the generic centrifuge cannot achieve any major axial retention force at such speeds.

Document WO 2011/054906 A1 discloses a centrifuge having a rotor which can be connected to a driveshaft via a locking mechanism. Said locking mechanism has levers which can be pivoted about axes that extend in parallel to the drive axis, and the mass distribution of these levers has been chosen so as to ensure that the levers will be retained in their locking position depending on the speed. In this situation, the levers will engage an annular groove provided in the driveshaft.

Document US 2008/0146429 A1 merely features one locking element which is moved from an unlocking position to a locking position by means of a handle that extends perpendicular to the driveshaft.

SUMMARY OF THE INVENTION

It is the object of the present invention to provide a centrifuge with a removable rotor which does not suffer from the above shortcomings and has a simpler and safer quick-acting closure that is also and above all speed-independent. More specifically, the locking mechanism is to occupy less space for its locking elements in the area of the rotor.

The invention is based on the recognition that it is possible to ensure secure axial locking of rotor and driveshaft in the removal direction when the rotor is being placed onto the driveshaft, by means of a locking device in which the driveshaft has a widened portion which extends through a rotor opening, and a closing unit between the rotor and said widened portion blocks said opening so as to securely fix the rotor relative to the driveshaft in the direction of removal. This is a simple way of firmly mounting the rotor on the driveshaft and of ensuring that the rotor will be securely retained within the centrifuge even at high speeds thereof and despite any resulting elastic deformation of centrifuge components, through means that can be manufactured in a simple way.

According to the present invention, the centrifuge comprises a driveshaft having an end section which tapers toward the remaining portion of the driveshaft, which tapering may be gradual or in steps, as well as a rotor which is mounted on the driveshaft and can be removed axially in a removal direction, and a rotor bearing surface which is connected to the driveshaft and fixes the rotor in position at least against the removal direction, moreover, a quick-acting closure which is integrated in the rotor and which acts to fix the driveshaft and the rotor in the removal direction, and, last but not least, an opening in the rotor through which the end section of the driveshaft extends and which is delimited by an opening wall of the rotor. For fixing the rotor in position relative to the driveshaft, locking elements are provided on the rotor side, which locking elements at least partially surround the end section of the driveshaft. In the removal direction, sections of the locking elements rest against the end section, and against the removal direction, they rest against the opening wall. In this situation, the outer circumference formed by the locking elements is larger than the inner circumference of the opening. This results in a wedge effect which will increase once a force starts to act on the rotating rotor in the removal direction. The end section has a widened portion which tapers toward the remaining portion of the driveshaft. The quick-acting closure is provided with force-transmitting elements which connect the locking elements to a handle so as to enable locking and/or unlocking of quick-acting closure by a respective movement of said handle and said force-transmitting elements in a direction in parallel to the driveshaft. This allows direct and very precise control of the locking and unlocking steps. Moreover, the step of placing the rotor onto the driveshaft can thus be optimally combined with the locking step, and the step of removing the rotor can likewise be optimally combined with the unlocking step. The solution according to the invention is less prone to defects than the generic design. The driveshaft and the rotor can be made of a simpler design. There are fewer parts which require complex installation. Irrespective of the centrifuge speed, the rotor will always be firmly secured in position.

This arrangement is advantageous in that only a relatively small end section of the driveshaft will have to be used for axially fixing rotor and driveshaft in position, and in that no locking mechanism is required which will exert a lateral force to achieve such fixing and for which a certain length of the driveshaft is required. Consequently, the inventive design requires less space and avoids a weakening of the driveshaft.

In a preferred embodiment of the invention, the locking elements can be resiliently moved by means of at least one spring and are preloaded in the direction of the driveshaft. This spring load ensures that, when the rotor is put on, the locking elements will easily reach their intended positions against the driveshaft which extends through the opening, that they will surround the end section of the driveshaft, thus axially securing both the rotor and the driveshaft.

Any undesired displacement of the locking elements from their intended positions can be counteracted especially well if the locking elements are adapted to be elastically deflected by the spring in such a way that the widest portion of the end section, with respect to the central axis of the driveshaft, can be passed.

Moreover, it is considered advantageous to provide the spring between the handle and the locking elements because this will considerably simplify the design of the quick-acting closure.

This design can be simplified further by using the force-transmitting elements to form the spring.

In an especially preferred embodiment of the invention, the force-transmitting elements are spring-loaded. This will ensure that the locking elements, which will initially be displaced from their positions by the end section of the driveshaft extending through the opening as the rotor is being placed in the centrifuge, will ultimately extend past said end section in the mounting direction, will rest against it and reliably perform their locking action.

An even more reliable function of the locking elements can be achieved by having the shape of the locking elements at least partially conform to the shape of the driveshaft end section. This design of the locking elements will result in improved form closure between the driveshaft end section and the quick-acting closure as well as between the quick-acting closure and the opening wall, thus reducing material stress, in particular of the locking elements.

It is convenient to make the driveshaft end section ball-shaped, and in particular, to make the transition area from the ball to the driveshaft concavely rounded since this will make it easier for the locking elements to surround the driveshaft end section and rest against it. In addition, this will make it easier to obtain a form closure between the driveshaft end section and the quick-acting closure, as well as between the quick-acting closure and the wall of the opening.

According to an aspect of the invention, the opening wall includes a control surface for the locking elements. This surface moves the locking elements towards the driveshaft and urges them into the locking position against the driveshaft when the rotor is being brought into the locking position of the quick-acting closure by moving it in a direction opposite to the removal direction. This also improves control of the locking elements, as these will readily slide into their locking position against minimum resistance.

The axial locking of rotor and driveshaft can be additionally stabilized by designing the control surface in such a way that, in the locking position, the side of the locking elements facing the end section will partly rest against said end section, and the side of the locking elements facing away from said end section will rest against the control surface. This will yield a better form closure between the driveshaft end section and the quick-acting closure, as well as between the quick-acting closure and the opening wall.

It has proven to be particularly advantageous if the control surface enables a deflection of the locking elements when moved in the removal direction, i.e. when the quick-acting closure is opened. This design allows the quick-acting closure to be unlocked easily with relatively little effort.

According to yet another aspect of the invention, the unlocking direction and the removal direction are the same. This is another way of making the quick-acting closure and the rotor simpler and more compact in design.

Removal of the rotor can be made very easy by mechanically coupling the steps of unlocking the quick-acting closure and of removing the rotor, since a single movement will then suffice to both unlock the closure and remove the rotor from the centrifuge.

A particularly safe locking can be accomplished by providing at least two, preferably three locking elements which are spaced at regular intervals from each other.

If the locking elements partially extend into the opening, this will yield an even better form closure between the driveshaft end section and the quick-acting closure, as well as between the quick-acting closure and the opening wall, thus also improving locking.

In a particularly preferred embodiment of the invention, a pivotal axis of the locking elements extends perpendicularly to the central axis of the driveshaft, and the springs, in their non-deflected position, extend downward from the pivotal axis, relative to the central axis, in particular in parallel to the central axis. This arrangement has the effect that, when the rotor is being mounted or removed, the locking elements will easily slide along the driveshaft end section, in particular along the locking ball, thus facilitating locking and unlocking.

According to another aspect of the invention, the spring and the locking element are formed in one piece, made from the same material and embrace the end section. This reduces production costs and improves the locking effect.

It is convenient to have the control surface extend concentrically to the central axis, at least along one height thereof, and to have the locking elements extend concentrically to the central axis, at least along one height thereof. This concentric arrangement results in even more reliable control of the locking elements and largely prevents any jamming or wedging of the locking elements, in particular when the rotor is being mounted.

Furthermore, it is considered advantageous to connect the handle, the force-transmitting elements, the springs and the locking elements in series. This will ensure that the unlocking and locking steps can be performed in a single movement, requiring only minimal effort.

In a preferred embodiment of the invention, in the unlocking and locking positions, the springs and the locking elements extend essentially in parallel relative to the central axis, and in the unlocking process, they temporarily extend diagonally relative to the central axis. This increases the clamping force of the locking elements and also clearly improves the locking effect of the quick-acting closure.

Additional advantages, features and possible applications of the present invention may be gathered from the description which follows, in which reference is made to the embodiments illustrated in the drawings.

Throughout the description, claims and drawings, those terms and associated reference signs are used as are listed in the List of Reference Signs below.

BRIEF DESCRIPTION OF THE DRAWINGS

In the drawings,

FIG. 6 is a cutout view of a cross section taken along the central axis of the centrifuge of FIG. 1, in which the quick-acting closure is already unlocked, but the rotor is still on the shaft;

FIG. 6a a cutout view of FIG. 6 on the side of the rotor in a slate in which the rotor has been taken off the driveshaft;

FIG. 6b a cutout view of FIG. 6 on the side of the shaft in which the rotor has been removed;

DESCRIPTION OF THE INVENTION

Figure 1:
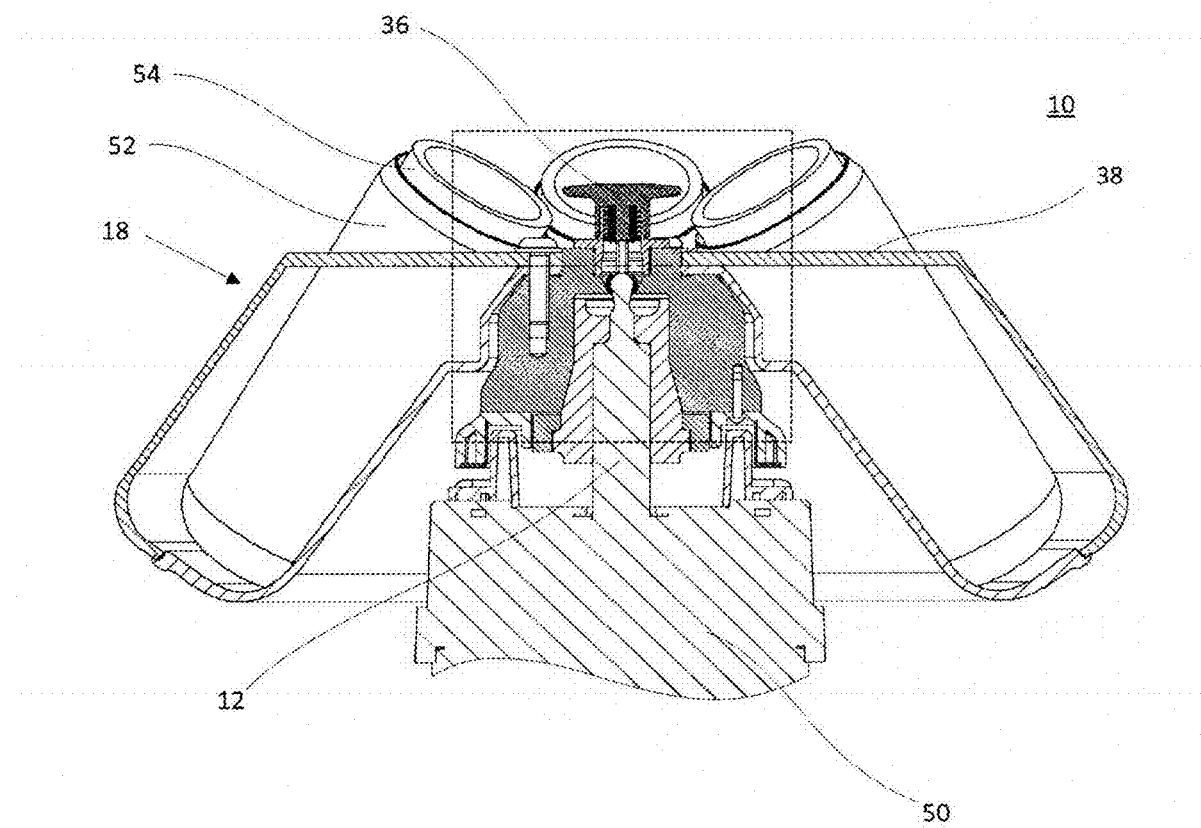
FIG. 1 is a sectional view along the central axis of the centrifuge according to the invention.
Figure 2:
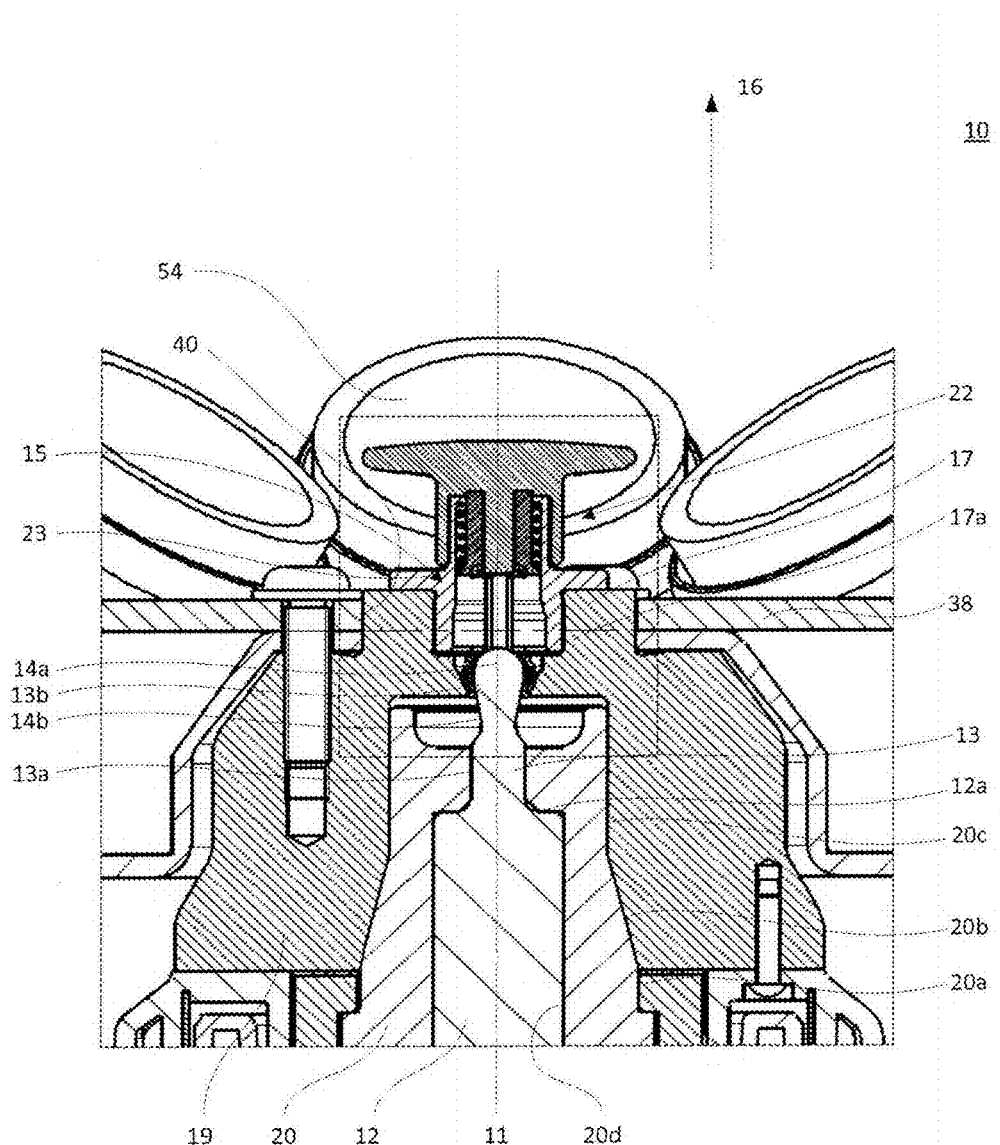
FIG. 2 is an enlarged detailed view of the section marked in FIG. 1.
Figure 3:
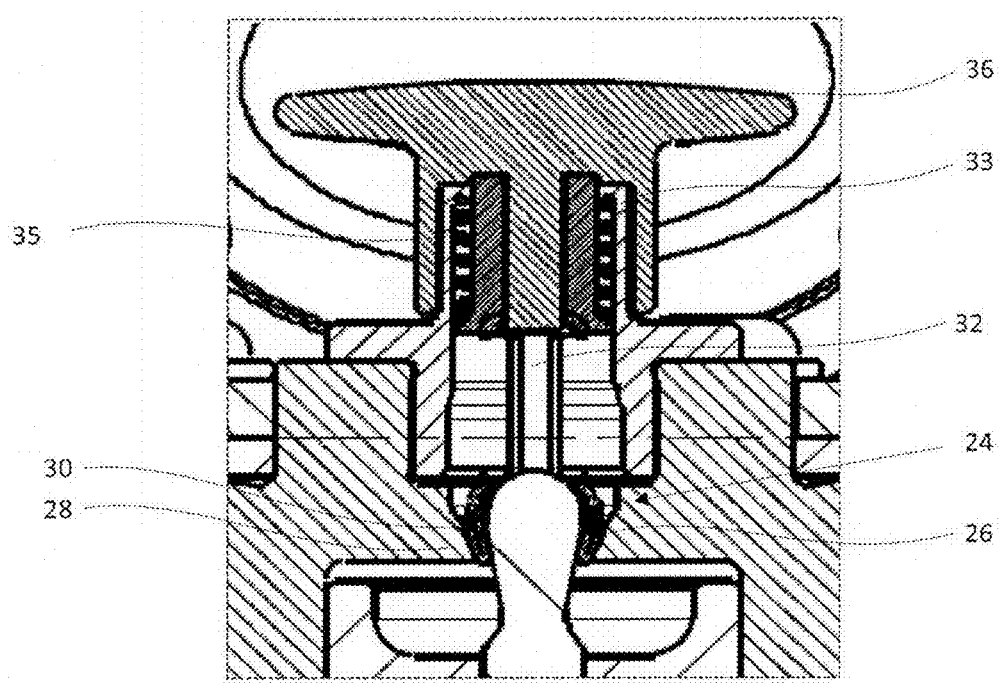
FIG. 3 is an enlarged detailed view of the section marked in FIG. 2.

FIG. 1 is a schematic view of a vertical section of a centrifuge designated by reference numeral 10. For the sake of clarity, the substructure is not shown therein, only the upper part of the motor is indicated schematically. For a clearer illustration, cutout views of FIG. 1 are shown in FIG. 2 to FIG. 7 which contain the elements that are essential to the invention.

According to the embodiment illustrated in FIGS. 1 to 7, the centrifuge 10 comprises a cylindrical driveshaft 12 and an adapter 20 which Is mounted on the driveshaft 12 for co-rotation therewith. Positioned on said adapter 20 is a concentrically mounted rotor hub 19 of a rotor 18. The adapter 20 and the rotor hub 19 are interconnected and mounted for co-rotation in the conventional manner. The rotor 18 comprises a quick-action closure 22.

The adapter 20 may either be designed to form a unit with the rotor hub 19 or with the driveshaft 12, and correspondingly either be adapted to the driveshaft 12 or to the rotor hub 19. As for the rest, the adapter 20 is optional. Alternatively, the driveshaft 12 may also be adapted to directly accommodate the rotor hub 19 in it.

The free end of the cylindrical driveshaft 12 continues in the form of a projection 13 which consists of a cylindrical section 13a and an end section 13b. The cylindrical section 13a is smaller in diameter than the driveshaft 12. The driveshaft 12 and the projection 13 are formed in one piece and made from the same material. The cylindrical section 13a of the projection 13 then continues in the form of an end section 13b. The end section 13b consists of a locking ball 14a mounted on its free end and a concave transition area 14b which is located between the locking ball 14a and the cylindrical portion 13a of the projection 13.

Mounted on the driveshaft 12 is the adapter 20. The adapter 20 is supported on the shoulder 12a which is formed around the projection 13 on the free end of the driveshaft 12, and has an external profile which is structured as follows. At the bottom, there is a base area 20a which is followed by a clamping cone 20b which tapers toward the top, which latter in turn is followed by a cylindrical portion 20c. A bore 20d extends through the adapter 20. Said bore 20d and thus said adapter 20 have an inner profile which is essentially adapted to the driveshaft 12. The inner profile of the adapter 20—in the regions of the base area 20a and of the clamping cone 20b—is completely adapted to the driveshaft 12 while in the area of the cylindrical portion 20c which surrounds the concavely formed transition area 14b below the locking ball 14a, said inner profile is spaced from said driveshaft 12.

The rotor 18 has a rotor hub 19 whose inner profile is essentially complementary to the outer profile of the adapter 20 in the areas which make contact with such outer profile, and in its conically shaped area 20b is supported on the adapter 20. The inner profile of the rotor hub 19 extends beyond the apex of the outer profile of the adapter 20 and then transitions into a rotor central area 15 which is formed in one piece with the rotor hub 19. The rotor central area 15 has a bottom side which, starting from the apex of the inner profile of the rotor hub 19, extends diagonally downwards in the direction of the central axis 11 up to the level of the transition from the locking ball 14a to the transition area 14b and forms an opening 24 in the centre of the rotor central area 15 with which the locking ball 14a engages. Said opening 24 is dimensioned such that the locking ball 14a can engage it with only minimum clearance, and includes an opening wall 26 whose diameter widens towards the top, with the bottom end of said opening wall 26 being formed as a closing contour/control surface 28 and with its top end transitioning into a shoulder 17a which extends perpendicular to the central axis 11. Above said shoulder 17a, the rotor central area 15 includes a concentric wall piece 17 whose upper part has a rectangular profile in cross-section on either side, which wall piece 17 extends through an opening 40 in the horizontal housing wall 38 and whose inner and outer sides are aligned in parallel to the central axis 11.

On the inner side of the wall piece 17, the quick-action closure 22 has been inserted so as to obtain an optimal fit, which closure 22 comprises a handle 36, a housing 23, an elongate connection element 35 guided within a guide tube, pressure springs 33 and a plurality of locking springs 32. Said handle 36 can be slid upward relative to the housing against the action of the pressure spring 33 in an unlocking and removal direction 16, in parallel to the central axis 11. For this purpose, the connecting element 35 has a shoulder 35a which is contacted by the pressure spring 33 at its bottom. The housing 23 extends to the top in a tubular manner and also has a shoulder 23a, the top of which is contacted by the pressure spring 33.

The locking springs 32 are force-transmitting elements which are mounted on a connecting ring 35b at the end of the connecting element 35 that faces the driveshaft 12 and which in turn include locking elements 30 at their end facing the driveshaft 12. Notably, the locking springs 32 and the locking elements 30 are formed in one piece. Located between the guide tube of the connecting element 35 and the inner wall of the housing 23 is a pressure spring 33 which is aligned in parallel to the central axis 11. Said pressure soling 33 exerts pressure in the direction of the driveshaft 12 on the unit consisting of connecting element 35, guide tube and locking springs 32 with locking elements 30. The locking elements 30 of said locking springs 32 rest against the locking ball 14a, which engages the rotor 18 through opening 24, in such a way that the locking elements 30 will get clamped between the closing contour 28 and the locking ball 14a.

Figure 4:
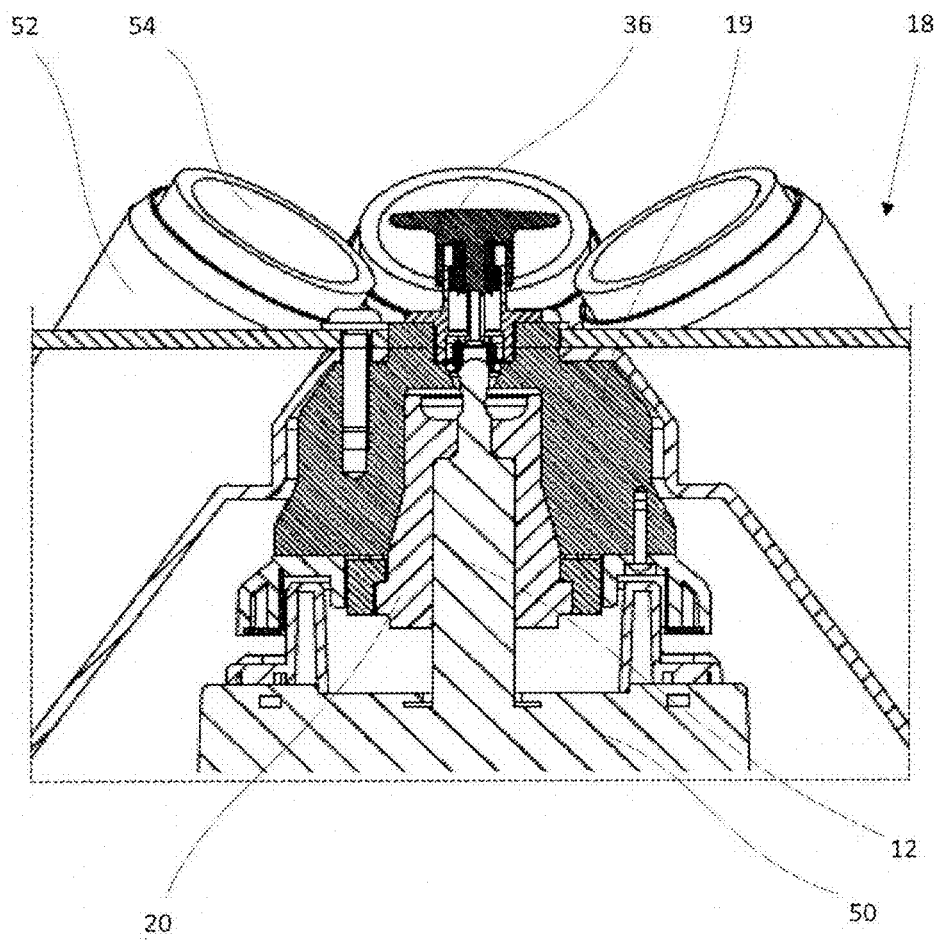
FIG. 4 is a sectional view of the quick-acting closure in its unlocked position.

FIG. 4 is a schematic view of the inner area of the rotor 18, the quick-action closure 22 and the locking ball 14a in the state they assume when the rotor 18 is placed onto the driveshaft 12 before locking. The outer circumference of the locking ball 14a at its widest portion 13c has been chosen such that it can pass through the opening 24 with minimum clearance. The pressure exerted by the pressure springs 33 in the direction of the driveshaft 12 will cause the sides of the locking elements 30 provided on the ends of the locking springs 32 which face away from the axis of the driveshaft 12 to rest against a closing contour 28.

Now, when the rotor 18 is pressed downward, the locking ball 14a will be urged through the opening 24, thereby first displacing the locking elements 30 both axially in the removal direction 16 and laterally. The resilient design of the locking springs 32 will cause the rocking elements 30 to slide along the surface of the locking ball 14e almost back into the position they had assumed before the engagement of the locking ball 14a.

The support surface 30b of the locking elements 30 will then rest against the closing contour 28 and the bearing surfaces 30a of the locking elements 30 which face the central axis 11 will rest against the locking ball 14a. In this situation, the locking elements 30 will become wedged between the locking ball 14a and the closing contour 28, thus fixing the rotor 18 in position relative to the driveshaft 12. As soon as the rotor 18 is in operation and has forces acting on it in the removal direction 16 owing to its rotation, this will increase the wedge effect of the locking elements 30 between the locking ball 14a and the locking profile 28 even more.

Once the rotor 18 comes to a standstill at the end of the centrifugation process, there will not be any forces acting on it in the removal direction 16 anymore. This will considerably reduce the wedge effect of the locking elements 30, thus making it easy to remove the locking elements 30 from their position between the locking ball 14a and the closing profile 28 by lifting the bolt head 36. Subsequently, the rotor 18 can be taken off the adapter 20 again.

Figure 5:
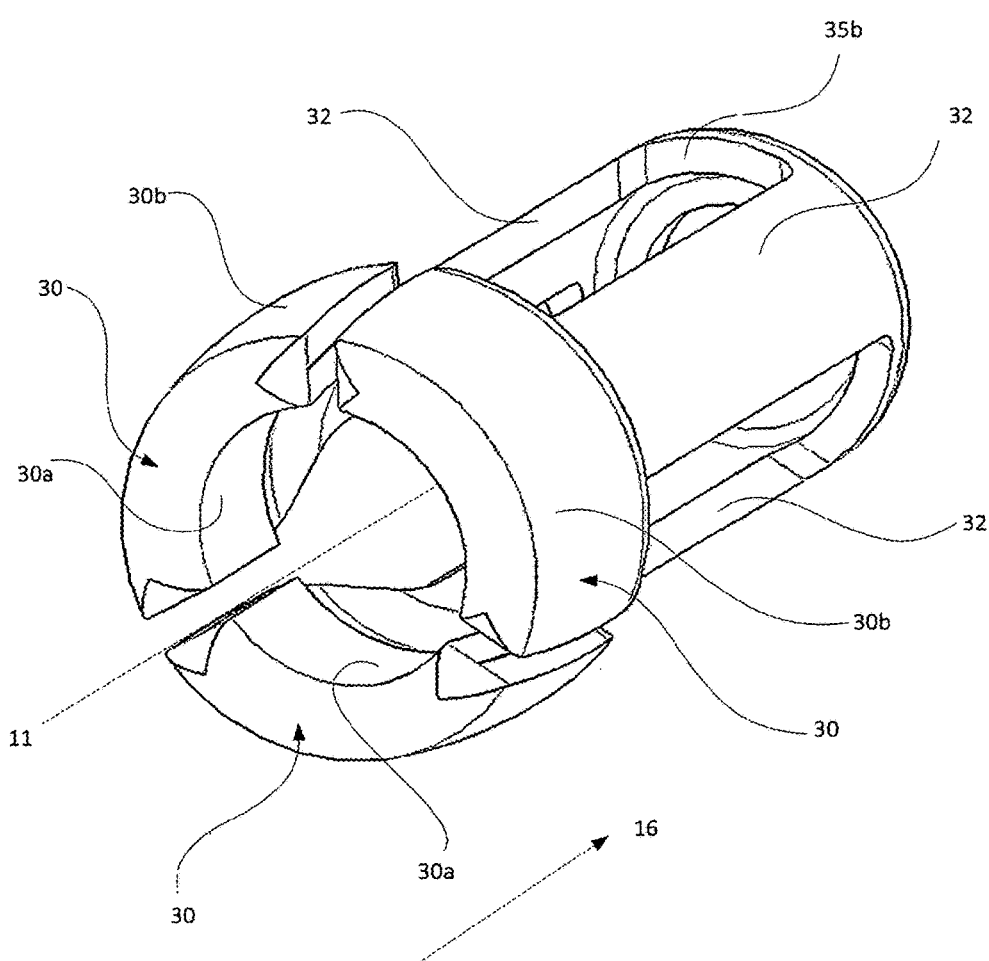
FIG. 5 is a perspective detailed view of the component unit consisting of locking springs and locking elements.

FIG. 5 is a perspective view of the arrangement of locking springs 32 and locking elements 30. On the side facing away from the viewer, there is a connecting ring 35b which extends concentrically around the central axis 11 on the end of the connecting element 35 (not shown here) facing the driveshaft 12. Three locking springs 32, which are formed in one piece and made from the same material as the connecting ring 35, are mounted evenly speed on the circumference of the connecting ring 35, whose ends—pointing in the direction of the viewer are each provided with a locking element 30. As already explained with reference to FIGS. 3 and 4, when the rotor 18 is placed onto the shaft, the locking elements 30 will initially be displaced both axially in the removal direction 16 and laterally by the locking ball 14a (which is not shown here for the sake of clarity). Once the locking ball 14a has passed, the locking elements 30 will be returned to their original position by the locking springs 32. The bearing surfaces 30a of the locking elements 30 which face the central axis 11 will then rest against the locking ball 14a, and the support surfaces 30b of the locking elements 30 will rest against the control surface 28 of the rotor hub 19 which is likewise not shown in here.

Figure 7A:
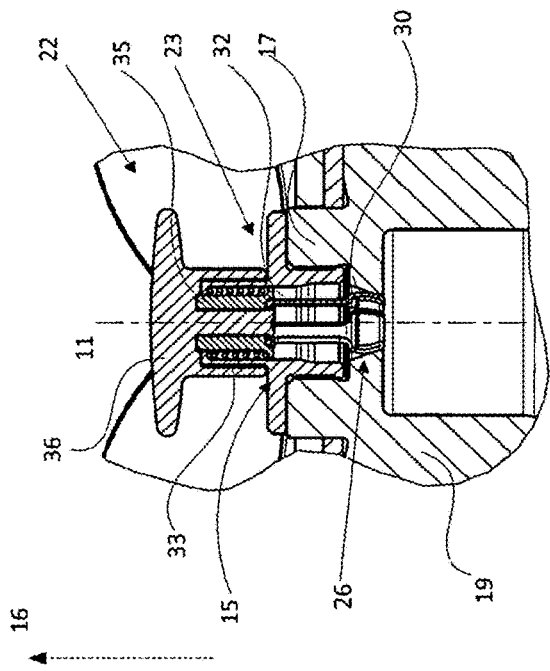
FIG. 7a a cutout view of FIG. 7 on the side of the rotor in the state in which the rotor has been taken off the driveshaft, and FIG. 7b a cutout view of FIG. 7 on the side of the shaft in which the rotor has been removed.
Figure 7B:
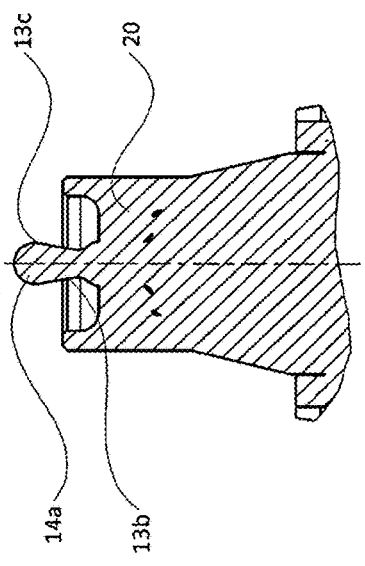
FIG. 7 a cutout view of a cross-section taken along the central axis of the centrifuge of FIG. 1 with a quick-action closure in the locked state of rotor and driveshaft.
Figure 7:
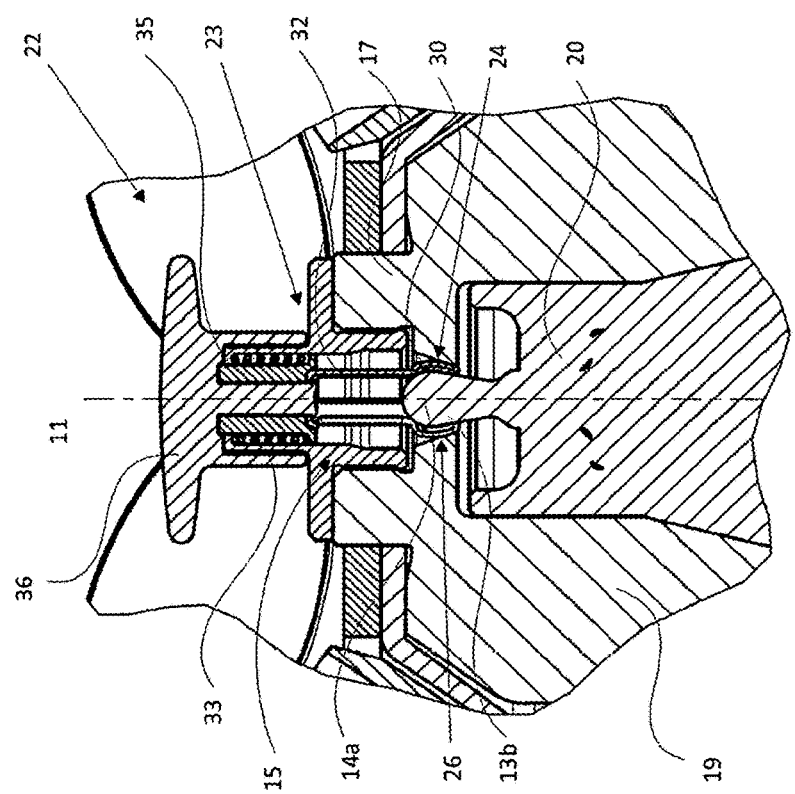

The views of FIGS. 6 and 7 illustrate once more how the quick-action closure 22 works. FIG. 6 is a view of the quick-action closure 22 when placed upon the driveshaft 12 and/or the adapter 20, and FIG. 7 is a view of the completely engaged state. FIGS. 6a and 6b as well as 7a and 7b, resp., each are cutout views of FIG. 6 and FIG. 7, resp., but subdivided into two partial views each (i.e. 6a and 7a on the side of the rotor, 6b and 7b on the side of the shaft).

As was already shown in the views of FIGS. 1 to 4, the rotor hub 19 is concentrically mounted on the adapter 20. The adapter 20 is mounted on and connected to the driveshaft 12 for co-rotation therewith. For the sake of simplicity, adapter 20 and driveshaft 12 are shown as a functional unit here so that, of the driveshaft 12, only its end section 13b with the locking ball 14b which projects from the adapter 20 on the side of the rotor can be seen in this view. The locking ball 14b engages the rotor central area 15 through the opening 24 in the rotor hub 19. In the removal direction 16, the wall piece 17 into which the quick-action closure 22 is inserted and with which it is firmly connected via a screwed connection (not shown here), is located above the rotor hub 19 and mounted concentrically to the central axis 11.

The handle 36 surrounds the housing 23 above the rotor 18 in the removal direction 16. Projections—shoulder 23a—provided on the end of the housing 23 facing the handle 36 and on the end of the connecting element 35 which engages the housing 23—shoulder 35a—act to prevent removal of the handle 36 from the housing 23. As explained above, pressure spring 33 is connected between the handle 36 and the housing 23.

In the views of FIG. 6 and supplementary FIGS. 6a and 6b, the pressure spring 33 is compressed, thus causing the unit formed by handle 36, connecting element 35 and locking springs 32 with locking elements 30 to be displaced on the central axis 11 in the removal direction 16. The free ends of the locking elements 30 make contact with the locking ball 14a, but do not rest against it and do not yet have a wedging effect.

In the views of FIG. 7 and supplementary FIGS. 7a and 7b, the pressure springs 33 are released, causing the unit formed by handle 36, connecting element 35 and locking springs 32 with locking elements 30 to be displaced in a direction opposite to the removal direction 16, as already described with reference to FIG. 4. The locking elements 30 are now clamped between the locking ball 14a and the control surface 28 and have a wedge effect.

LIST OF REFERENCE SIGNS 10 centrifuge
11 central axis
12 driveshaft
12a shoulder
13 projection
13a cylindrical portion
13b end section
13c widest portion
14a locking ball
14b transition area
15 central area of rotor
16 removal direction
17 wall piece
17a shoulder
18 rotor
19 rotor hub
20 adapter
20a base area
20b clamping cone
20c cylindrical portion
20d bore
22 quick-action closure
23 housing
23a shoulder of the top of housing 23
24 opening
26 opening wall
28 control surface
30 locking elements
30a bearing surface
30b support surface
31 pivotal axis
32 locking springs
33 pressure spring
35 connecting element
35a shoulder of connecting element 35
35b connecting ring
36 handle
38 housing wall
40 opening
50 motor 52 recesses for sample containers
54 sample containers

The invention claimed is:
1. A centrifuge, comprising:
a driveshaft, said driveshaft rotatable about a central axis, and said driveshaft includes an end section that tapers toward said central axis of said driveshaft,
a rotor, an opening in said rotor, said end section of said driveshaft extending through said opening, which is delimited by an opening wall of said rotor;
said rotor is mounted on said driveshaft and which is axially removable in a removal direction;
said rotor includes multiple locking elements on said rotor fixing said rotor and said driveshaft together;
each of said multiple locking elements includes a bearing surface for said rotor, each of said bearing surfaces is connected to said driveshaft holding said rotor at least against movement in said removal direction;
a quick-action closure integrated into said rotor, said quick-action closure fixes movement of said driveshaft and said rotor;
said locking elements at least partially surround said end section in order to fix said rotor relative to said driveshaft;
said locking elements include bearing surfaces facing in said removal direction and rest against said end section;
said locking elements include support surfaces facing in a direction opposite said removal direction and rest against said opening wall of said rotor;
said support surfaces of said locking elements form an outer circumference which is larger than an inner circumference of said opening when said locking elements are resting against said opening wall;
said end section has a widest portion which tapers into a remaining section of said driveshaft;
said quick-action closure has force-transmitting elements connecting said locking elements to a handle;
said quick-action closure is locked and/or unlocked by a respective movement of said handle and said force-transmitting elements in a direction parallel to said central axis.
2. The centrifuge as claimed in claim 1, further comprising:
said locking elements are resiliently moved by at least one spring and are preloaded in a direction toward said driveshaft.
3. The centrifuge as claimed in claim 2, further comprising:
said spring is located between said handle and said locking elements.
4. The centrifuge as claimed in claim 2, further comprising:
said force-transmitting elements are springs.
5. The centrifuge as claimed in claim 2, further comprising:
said force-transmitting elements are springs causing said locking elements, when initially displaced from their position by said end section of said driveshaft engaging through said opening as the rotor is mounted, to move past said end section in a mounting direction, rest against said end section and lock said rotor to said driveshaft.
6. The centrifuge as claimed in claim 1, further comprising:
said locking elements are elastically displaced by a spring for unlocking and/or locking said quick-action closure such that said locking elements move past said end section at said widest portion relative to said central axis.
7. The centrifuge as claimed in claim 1, further comprising:
said locking elements are adapted to the shape of said end section of said driveshaft.
8. The centrifuge as claimed in claim 1, further comprising:
said end section of said driveshaft includes a locking ball, and said driveshaft includes a transition region intermediate said locking ball and said driveshaft.
9. The centrifuge as claimed in claim 1, further comprising:
said opening wall includes a control surface for engagement with said locking elements;
when said rotor is moved in a direction opposite to said removal direction:
said locking elements are moved in said direction of said driveshaft and urge them into said locking position against said driveshaft; and,
said control surface is brought into a locking position of said quick-action closure.
10. The centrifuge as claimed in claim 9, further comprising:
a portion of said locking elements engage said end section and a portion of said locking elements engage said control surface in said locking position.
11. The centrifuge as claimed in claim 9, further comprising:
said control surface, when moved in said removal direction, during opening of said quick-action closure, allows a deflection of said locking elements.
12. The centrifuge as claimed in claim 11 wherein said removal direction is the unlocking direction.
13. The centrifuge as claimed in claim 9, further comprising:
said control surface extends concentrically to said central axis, at least along a height thereof, and said locking elements extend concentrically to said central axis, at least along a height thereof.
14. The centrifuge as claimed in claim 1 wherein said quick-action closure and said rotor are coupled together.
15. The centrifuge as claimed in claim 1, further comprising:
three locking elements are provided and said locking elements are spaced at regular intervals from each other.
16. The centrifuge as claimed in claim 1, further comprising:
a portion of said locking elements extends into said opening.
17. The centrifuge as claimed in claim 1, further comprising:
a pivotal axis of said locking elements extends perpendicular to said central axis of said centrifuge, and, non-deflected springs connected to said locking elements extend downward from said pivotal axis parallel to said central axis.
18. The centrifuge as claimed in claim 17, further comprising:
said springs and said locking elements are formed in one piece and made from the same material and surround said end section of said driveshaft.
19. The centrifuge as claimed in claim 1, further comprising:
said force-transmitting elements are springs; and, said locking elements are connected to said springs in series.

20. The centrifuge as claimed in claim 1, further comprising:
   said force-transmitting elements are springs;
   said springs and said locking elements are aligned in parallel with said central axis when said rotor is locked with said drive shaft; and,
   said springs and said locking elements are aligned diagonally to said central axis when said rotor is not locked with said drive shaft.

\* \* \* \* \*

UNITED STATES PATENT AND TRADEMARK OFFICE
CERTIFICATE OF CORRECTION

PATENT NO. : 10,300,499 B2
APPLICATION NO. : 14/905828
DATED : May 28, 2019
INVENTOR(S) : Hornek et al.

It is certified that error appears in the above-identified patent and that said Letters Patent is hereby corrected as shown below:

In the Specification

Column 1, after the title "CENTRIFUGE WITH REMOVABLE ROTOR" insert --The invention relates to a centrifuge.--.

Column 1, Line 32, after "locking" delete "fevers" and insert --levers-- therefor.

Column 5, Line 23, after "which" delete "Is" and insert --is-- therefor.

Column 6, Line 44, after "pressure" delete "soling" and insert --spring-- therefor.

Column 7, Line 1, after "locking ball" delete "14e" and insert --14a-- therefor.

Signed and Sealed this
Eighth Day of October, 2019

Andrei Iancu
*Director of the United States Patent and Trademark Office*